W. P. DUN LANY.
MEANS FOR CONTROLLING TALKING MACHINES.
APPLICATION FILED OCT. 30, 1916.

1,284,073.

Patented Nov. 5, 1918.
3 SHEETS—SHEET 1.

Witnesses:
W. P. Kilroy
Harry R. L. White

Inventor:
William P. Dun Lany
By Miller, Chindahl & Parker
Attys

W. P. DUN LANY.
MEANS FOR CONTROLLING TALKING MACHINES.
APPLICATION FILED OCT. 30, 1916.
1,284,073.
Patented Nov. 5, 1918.
3 SHEETS—SHEET 2.
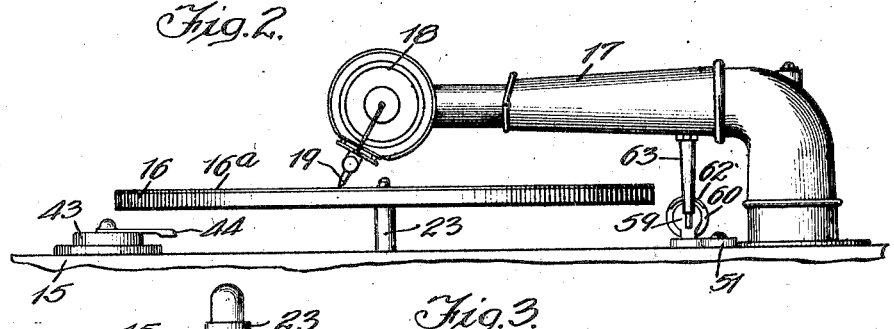
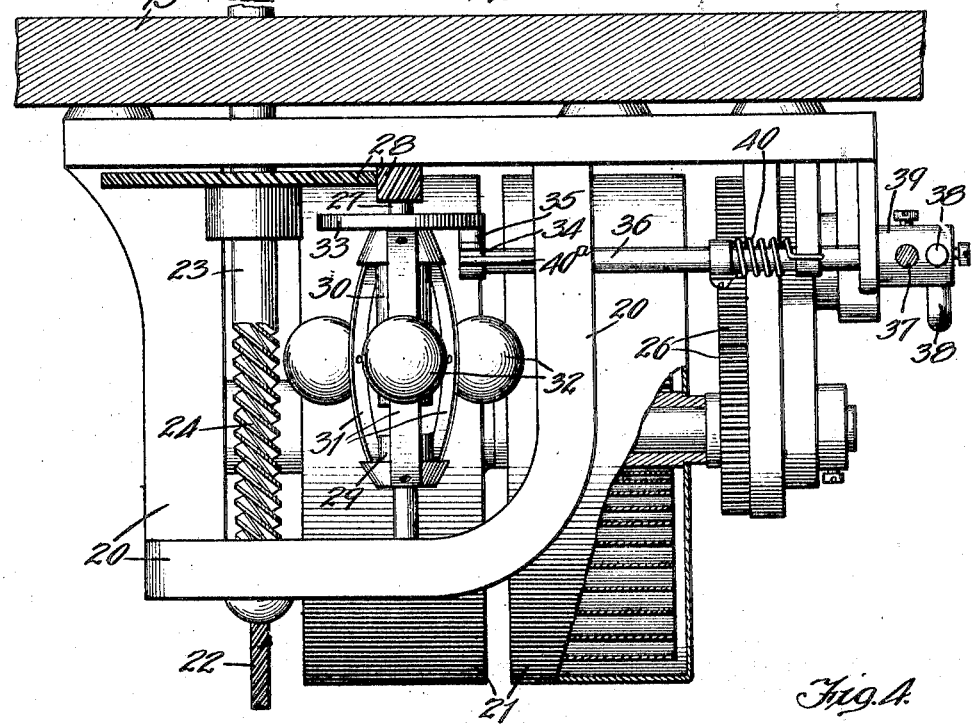
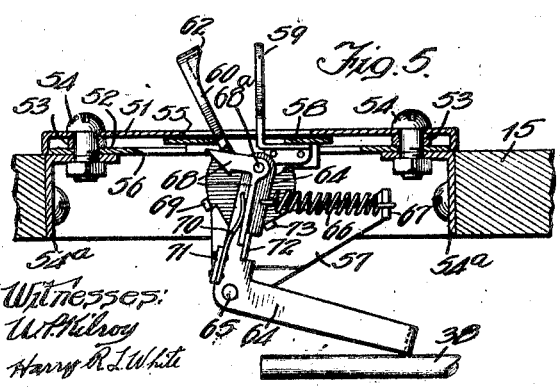
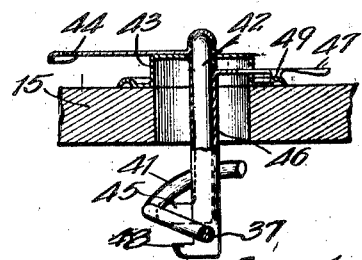

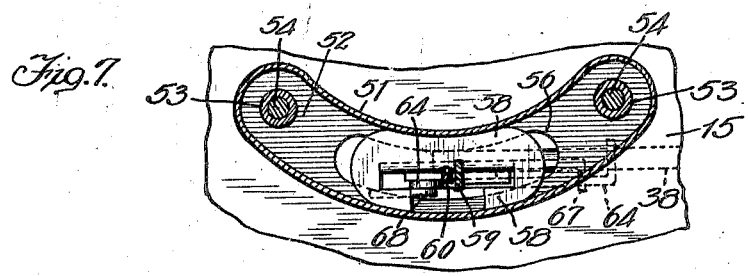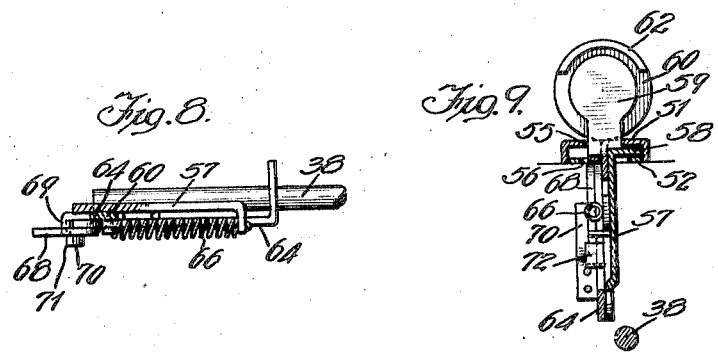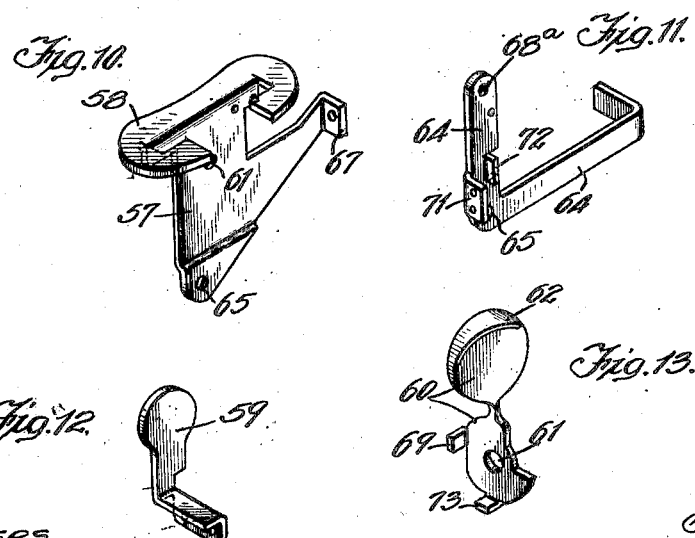

UNITED STATES PATENT OFFICE.

WILLIAM P. DUN LANY, OF CHICAGO, ILLINOIS, ASSIGNOR TO SEARS, ROEBUCK AND COMPANY, OF CHICAGO, ILLINOIS, A CORPORATION OF NEW YORK.

MEANS FOR CONTROLLING TALKING-MACHINES.

1,284,073.  Specification of Letters Patent.  Patented Nov. 5, 1918.

Application filed October 30, 1916. Serial No. 128,365.

*To all whom it may concern:*

Be it known that I, WILLIAM P. DUN LANY, a citizen of the United States, residing at Chicago, in the county of Cook and State of Illinois, have invented certain new and useful Improvements in Means for Controlling Talking-Machines, of which the following is a specification.

One of the objects of this invention is to produce improved means for automatically stopping the motor or the turntable at the finish of a record.

Another object is to provide a combined manual and automatic controlling means of improved construction.

Figure 1:
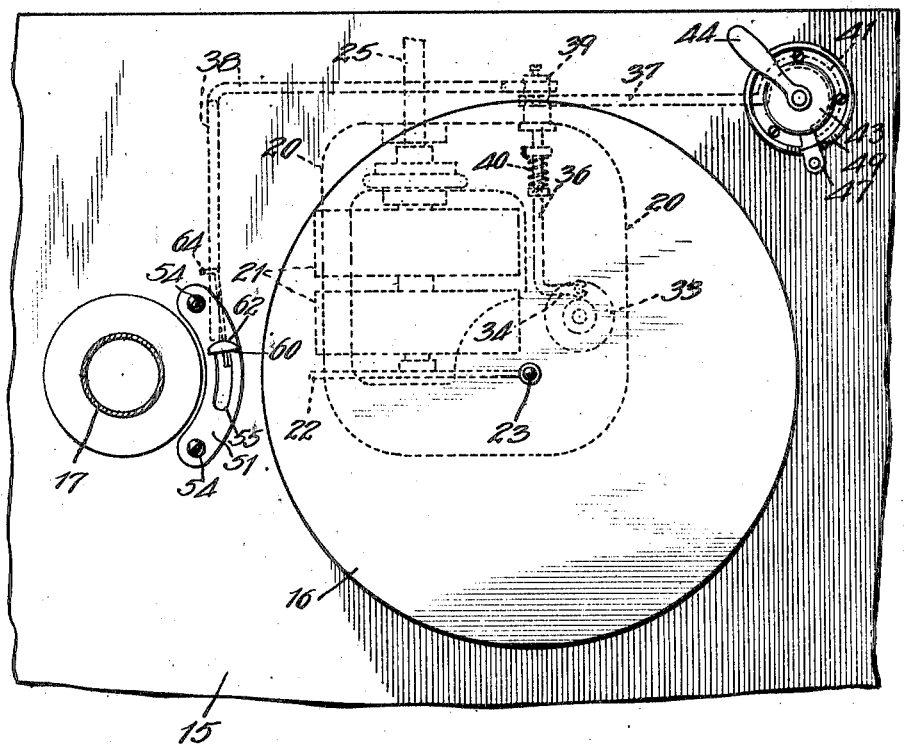
Figure 6:
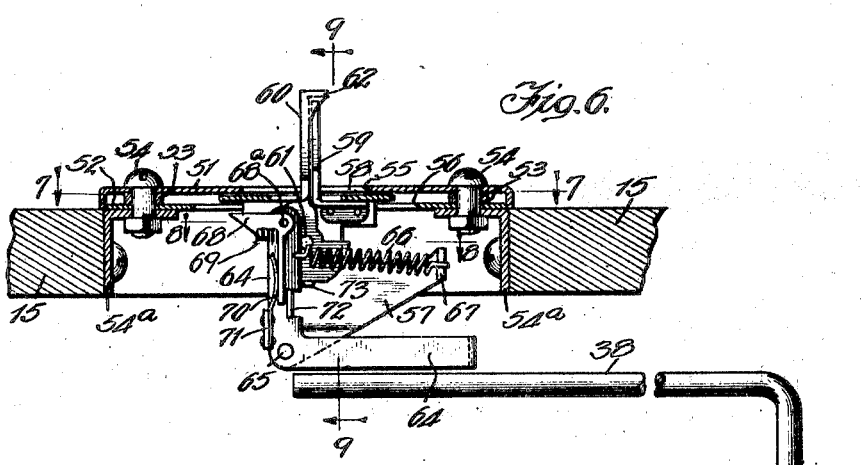

In the accompanying drawings, Figure 1 is a plan view illustrating a portion of a talking machine embodying the features of my invention. Fig. 2 is a side elevation. Fig. 3 is a front elevation of the motor and a portion of the controlling means. Fig. 4 is a view partially in vertical section and partially in elevation illustrating the manual controlling means. Fig. 5 is a view partially in vertical section and partially in elevation illustrating the automatic stop means. Fig. 6 is a view like Fig. 5 but showing the parts in a different position. Fig. 7 is a horizontal section in the plane of line 7—7 of Fig. 6. Fig. 8 is a horizontal section in the plane of line 8—8 of Fig. 6. Fig. 9 is a vertical section in the plane of line 9—9 of Fig. 6. Figs. 10 to 13 are detailed perspective views of elements embodied in the automatic stop device, Fig. 10 showing the adjustable supporting bracket, Fig. 11 the bell-crank lever, Fig. 12 the finger piece for moving the adjustable bracket, and Fig. 13 the trip member.

While my invention may be embodied in various forms, I have shown in the drawings, and will herein describe in detail, only the preferred embodiment, it being understood that I aim to cover in the appended claims all modifications and equivalents falling within the scope of my invention.

Referring to the drawings, 15 indicates a supporting board or base above which are located the turntable 16, record 16ᵃ, tone arm 17, sound box 18, stylus 19, parts of the manual controlling means, and parts of the automatic stop device. This base board may form a part of the casing or cabinet of the talking machine. The motor may be of any desired type or construction, being in the present instance of the spring actuated type and being secured to the underside of the board 15. The frame of the motor is indicated at 20, the spring drums at 21, and a gear wheel driven by said drums at 22. 23 indicates the rotary spindle on the upper end of which the turntable 16 is secured, said spindle having a worm 24 thereon meshing with and driven by the gear wheel 22. The springs in the drums 21 are wound up by a winding shaft 25 (see Fig. 1) and connecting gears 26 (Fig. 3) which are held against reverse rotation by a pawl and ratchet device in the usual way.

The speed of the motor is controlled by a centrifugal governor of any desired construction, that herein shown comprising a shaft 27 connected by gears 28 to the spindle 23, a collar 29 fixed on said shaft, a sleeve 30 slidable on said shaft, and leaf springs 31 having their opposite ends fixed to said collar and said sleeve and carrying weights 32. A brake disk 33 is fixed to the sleeve 30 and is arranged to be drawn therewith longitudinally of the shaft 27 by the centrifugal action of the weights 32. A brake arm 34 has a shoe 35 engaging the disk 33, and the turntable and motor are started, stopped, and the speed thereof controlled by movement of this brake arm.

My improved controlling means comprises a rock shaft 36 which may be mounted in bearings in the frame 20 of the motor and on one end of which the brake arm 34 is fixed. On the opposite end of the shaft 36 are fixed two controlling arms 37 and 38 by suitable means, such as a collar 39 fixed on the shaft and having transverse openings in which the arms are fixed by set screws. A coiled spring 40 acts on the shaft 36 and tends to move the shaft and arms 37 and 38 in a direction to withdraw the brake arm from the disk and release the brake. A stop pin 40ᵃ seated in the motor frame is arranged to limit the withdrawing movement of the brake arm.

The arm 37 is arranged to be controlled by manual means whereby to start and stop the motor and regulate the speed thereof, said means being fully described and claimed in my co-pending application Serial No. 127,075, filed October 23rd, 1916.

An arcuate cam 41 (Fig. 4) is fixed on the forward end of the arm 37 and is inclined with respect to the arm or in other words is shaped like a portion of a helix. The start-and-stop device comprises a shaft 42 mounted in a bearing member 43 on the board 15, and upper and lower arms 44 and 45 fixed on said shaft, the lower arm underlying the cam 41. The regulator device comprises a tubular shaft 46 surrounding the shaft 42 and having upper and lower arms 47 and 48 fixed thereon, the lower arm being arranged to underlie the cam 41 and limit movement of the controlling arm 37. The upper arms 44 and 47 are arranged to be adjusted by the operator. A dog 49 on the arm 47 engages notches in the bearing member 43 to hold the speed regulating device in any desired position.

The start-and-stop device is arranged to coöperate with the higher portion of the cam 41 while the speed regulating device is arranged to coöperate with the lower portion of the cam, the arm 47 of the speed regulator being in a plane lower than the arm 45 of the start-and-stop device. When the start-and-stop device is swung to move the arm 45 beneath a higher portion of the cam, the cam and the controlling arm 37 will descend, so that the brake arm 34 will be released and the motor will be permitted to start. The extent to which the cam may descend is governed by the position of the arm 48 which thereby regulates the maximum speed which the motor may attain.

The controlling arm 38 for the automatic stopping means is bent to pass beneath the winding shaft 25 and has an angular end portion extending toward the axis of the tone arm 17 in position to be engaged by the automatic stop device to be now described.

The automatic stop device is mounted adjacent to the axis of movement of the tone arm 17 and comprises a guide which, in the present instance, is of arcuate form concentric with the said axis and is composed of upper and lower plates 51 and 52, the upper plate having an angular flange running along its edges and receiving the lower plate. The two plates are spaced apart by sleeves 53 and are secured to the base by screws or bolts 54 passing through the plates and through the spacing sleeves and seated in attaching brackets 54ª. The base is cut out beneath the plates to accommodate the moving parts of the stop device, and the plates have slots 55 and 56 therein for a similar purpose.

A bracket 57 (Fig. 10) has a horizontal notched head or flange 58 at its upper end which fits snugly in the guide provided by the plates 51 and 52. A finger piece 59 (Fig. 12) is rigidly fixed to the bracket 57 and provides means for adjusting the bracket in the guide to set the stop in proper position to act with different records. A trip member 60 (Fig. 13) is pivoted at 61 on the bracket 57, the lower or pivoted end of said trip member lying parallel with the bracket and the upper end of said member being twisted to lie at right angles to the lower portion and parallel to and closely alongside of the finger piece 59. The upper end of the trip member has an angular laterally extending flange 62 which projects above and beyond the finger piece and is adapted to be engaged by a depending pin 63 (Fig. 2) fixed to the tone arm so that the trip member will be operated at the finish of a record.

A bell-crank lever 64 (Fig. 11) is pivoted at its angle at 65 on the lower end of the bracket 57, the horizontal arm of said lever having an angular end which overlies the controlling arm 38. A coiled tension spring 66 is attached at one end to the upright arm of the lever and at its other end to a lug 67 on the bracket 57 and this spring tends to swing the lever in the direction to depress the horiozntal arm thereof and consequently the controlling arm 38 so as to apply the brake and stop the motor and turntable.

Swinging movement of the lever 64 as effected by the spring 66 is normally prevented by releasable means which is adapted to be disengaged by movement of the trip member in one direction so as to release the lever to the action of its spring. This means in the present instance provides a detachable connection between the trip member and the lever and may be constructed as follows: A dog 68 is pivoted at 68ª on the upper end of the upright arm of the lever 64, one end of the dog being adapted to hook over an angular lug 69 on the lower part of the trip member and the other end of the dog depending from its pivot so as to be engaged by a leaf spring 70 which is fixed to a lug 71 on the lever 64, said leaf spring tending to swing the dog in a direction to hold it in engagement with the lug 69. An angular lug 72 on the lever 64 is positioned at the side of the dog opposite to leaf spring 70 to limit the movement of the dog caused by the leaf spring when the engagement between the dog and the lug 69 is broken. When the dog 68 is in engagement with the lug 69, the line of tension exerted by the spring 66 on the trip member is located in a horizontal plane above the pivot point 61 of the trip member so that the spring tends to hold the upper end of the trip member against the finger piece 59. An angular lug 73 on the extreme lower end of the trip member 60 is arranged to engage the upright arm of the bell-crank lever, whereby the return of the trip member to active position will swing the bell-crank lever in the direction opposite to that caused by the spring 66 so as to reëngage the dog with the lug 69.

When the pin 63 on the tone arm strikes the flange 62 on the trip member, the latter will be swung to withdraw the lug 69 downwardly out of engagement with the dog, whereupon the spring 66 will quickly swing the lever into the position shown in Fig. 5 to depress the controlling arm 38 and apply the brake. The notched head or flange 58 on the supporting bracket 57 limits the movement of the trip member and the latter through the lug 73 limits the movement of the lever. By grasping the upper end of the trip member and the finger piece 59 between the fingers and pressing them together, the trip member and the lug 73 thereon may be moved in the reverse direction so as to swing the bell-crank lever in opposition to the spring 66 into position to reëngage the dog 68 with the lug 69, in which position (shown in Fig. 6) the parts will remain until the device is again tripped.

Assuming the parts to be in the positions indicated in Figs. 4 and 5, when it is desired to operate the talking machine, a disk record is placed on the turntable; the bracket 57 is adjusted (if necessary) toward one end of the slot in its guide (the right hand end Fig. 5) by grasping the finger piece 59 and sliding the bracket in the guide; the tone arm is swung toward the center of the record until the stylus 19 overlies one of the innermost grooves at the finish of the record, in which movement of the tone arm the pin 63 will engage the finger piece 59 and properly position the bracket 57; the tone arm is then swung toward the beginning (outer edge) of the record grooves; the trip member 60 is swung toward the finger piece 59 to reset the automatic stop device; the start-and-stop device 42, 44, 45 is swung to permit the controlling arm 37 to drop as far as permitted by the speed regulator device 46, 47, 48, whereupon the brake will be released and the motor and turntable will start; and the stylus may then be allowed to rest in a groove at the outer edge of the record. When the stylus reaches the finish of the record the trip pin 63 on the tone arm will engage the flange 62 on the trip member 60 and swing said member to release the dog 68 and permit the spring 66 to swing the bell-crank lever 64 and depress the controlling arm 38 to apply the brake and automatically stop the motor and turntable. The supporting bracket 57 fits its guide tightly enough to provide sufficient friction so that the bracket will not be accidentally moved in the guide by the engagement of the stop pin 63 with the trip member 60.

Before changing records the operator may if desired, move the start-and-stop device 42, 44, 45, into stop position to support the cam 41 and controlling arm 37, but it has been found that with a little practice this is not necessary and the automatic stop device can be utilized as starting means independent of said manual start-and-stop device. If the manual start-and-stop device is left in start position, the act of resetting the automatic stop device is the last act preceding that of depositing the stylus on the record to start playing and, as will be seen, such act of resetting the automatic stop device will cause the motor and turntable to start again since the spring 40 tends to rock the shaft 36 in the direction to release the brake. In playing different records which have their inner grooves equidistant from the center the position of the bracket 57 in its guide need not be changed.

While I have herein shown the turntable as driven by a spring actuated motor, it will be understood that other types of motors may be employed without departing from the invention. In the construction shown, the rotation of the turntable is stopped by braking means applied to the governor which thereby stops the motor, but this arrangement is not essential to my invention and might be varied in many ways, for example, by having the controlling means operate on a current-supply switch if the motor be an electric one, or by having the controlling means operate on a disengageable clutch from which the turntable is driven. The exemplary type of talking machine herein disclosed is arranged to operate on records in which the beginning of the sound groove is at the outer edge of the record and the finish of the sound groove at the inner portion of the record. It will be understood, however, that my invention is not limited to use with records of this type but may be applied to talking machines adapted to coact with disk records wherein the beginning and finish of the sound groove are reversed, or indeed with talking machines using other types of records.

The foregoing modifications are mentioned as merely illustrative, but many other changes and variations may be made without departing from the spirit and scope of the invention.

I claim as my invention:

1. Controlling means of the class described comprising, in combination, a centrifugal governor, a rock shaft, a brake disk movable by said governor, a brake arm fixed on said rock shaft and coöperating with said brake disk, two controlling arms fixed on said rock shaft and extending in opposite directions, manually operable means coöperating with one of said controlling arms for positioning said brake arm, and means automatically operable at the finish of a record arranged to coöperate with the other one of said controlling arms to position said brake arm.

2. Controlling means of the class described comprising, in combination, a centrifugal governor, a brake disk movable thereby, a brake arm coöperating with said disk, a rock shaft on which said arm is fixed, two controlling arms fixed on said rock shaft, manually operable means coöperating with one of said controlling arms for positioning said brake arm, and spring-actuated means arranged to be released at the finish of a record for moving the other one of said controlling arms to apply the brake.

3. Controlling means of the class described comprising, in combination, a brake element, two controlling members operatively connected to said element, manually operable means coöperating with one of said members for positioning said brake element, and means automatically operable when the tone arm is near the end of the record arranged to coöperate with the other one of said controlling members to position the brake element.

4. Controlling means of the character described comprising, in combination, a brake element, two controlling members operatively associated therewith, means tending to move said members and said element in the direction to release the brake, manually operable means coöperating with one of said members and arranged to prevent or limit said movement of the brake element, and means operable when the tone arm is near the end of a record for automatically moving the other one of said members to apply the brake.

5. A talking machine comprising, in combination, a turn-table, a spindle therefor, a motor and a centrifugal governor operatively connected to said spindle for driving and controlling the latter, a brake element operable by said governor, a coöperating brake element, two controlling members operatively connected to the latter brake element, manually operable means coöperating with one of said members for positioning said brake element, and means which is operable by the tone arm when the latter is at the finish of a record for automatically moving the other one of said controlling members to apply the brake.

6. Controlling means of the class described comprising, in combination, a controlling device having a brake element thereon, manually operable means arranged to act on said device, and independent automatically operable means also arranged to act on said device, said controlling device being movable independently of each of said means.

7. Controlling means of the class described comprising a motor driven governor, a brake element movable thereby, a coöperating brake element, a controlling device for moving the latter brake element, manually operable means coacting with said controlling device to release or apply the brake so as to start or stop the motor, independently operable manual means coacting with said device for positioning the brake element to regulate the speed of the motor, and means independent of both of said manually operable means arranged to coöperate with said device and automatically operable to apply the brake and stop the motor.

8. A talking machine having, in combination, a rotary turn-table, a motor connected thereto, a centrifugal governor connected to the motor and turn-table, a brake disk movable by said governor, a coöperating brake element, a rock shaft carrying said brake element, two controlling arms fixed on said shaft and arranged to position said brake element, manually operable means comprising two independently acting devices coöperating with one of said arms for positioning said brake element to start and stop the motor and regulate the speed thereof, a swinging tone arm, and means operable by said tone arm at the finish of a record for effecting movement of the other one of said controlling arms to automatically apply the brake and stop the motor.

9. Controlling means of the character described comprising, in combination, a rock shaft, a controlling device operable thereby, two arms fixed on said shaft, means tending to rock said shaft in the position to release the brake, means coöperating with one of said arms for controlling the movement thereof, and automatically operable means coöperating with the other one of said arms for positively swinging both arms and rocking said shaft to operate the controlling device.

10. Controlling means of the class described comprising, in combination, a rock shaft, braking means operable thereby, two arms fixed on said rock shaft, means tending to rock said shaft and swing both of said arms in the direction to release the brake, manually operable means comprising two independently movable devices coöperating with one of said arms to prevent movement thereof in the direction of its tendency and to limit such movement for speed regulation, and means automatically operable at the finish of a record and arranged to coöperate with the other one of said arms and rock said shaft to apply the brake.

11. A talking machine having, in combination, a turn-table, means for rotating the same, a swinging tone arm, a centrifugal governor operatively associated with said turn-table, a brake disk movable by said governor, a coöperating brake element, a controlling member for operating said brake element, and means positioned adjacent to the periphery of said turn-table and adjacent to the axis of movement of said tone arm and operable by the latter for automatically moving said controlling member to apply the brake, the said means comprising a bell-crank lever arranged to engage and move said controlling member, a spring tending to swing said bell-crank lever in the direction to apply the brake, a spring-pressed dog mounted on said bell-crank lever, and a pivoted trip member having a stop coöperating with said dog to hold said bell-crank lever in inoperative position, said trip member being arranged to be engaged and swung by a part moving with said tone arm to withdraw said stop and release said bell-crank lever to the action of its spring.

12. Controlling means of the character described comprising, in combination, a governor, braking means coöperating therewith, a member arranged to apply the brake, a bell-crank lever arranged to engage said member, a spring tending to swing said bell-crank lever in the direction to apply the brake, a spring-pressed dog mounted on said bell-crank lever, and a pivoted trip member having a stop coöperating with said dog to hold said bell-crank lever in inoperative position, said trip member being adapted to be swung to withdraw its stop whereby to release said bell-crank lever to the action of its spring.

13. A talking machine having, in combination, a supporting base, a turn-table and a tone arm mounted above said base, a motor-driven governor mounted beneath said base and operatively associated with said turn-table, braking means beneath said base coacting with said governor, a brake-operating member, a lever pivoted beneath said base and arranged to engage said brake-operating member, a spring tending to swing said lever in the direction to apply the brake, a dog carried by said lever, and a pivoted trip member having a stop coöperating with said dog to maintain said lever in inoperative position, said trip member having a portion extending above said base and arranged to be engaged by a part on the tone arm for swinging the stop member to release said lever to the action of its spring.

14. A talking machine having, in combination, a supporting base, a turntable and a tone arm mounted above said base, braking means beneath said base arranged to control said turntable, a pivoted lever extending beneath said base and arranged to operate said braking means, said lever tending to move in a direction to apply the brake, and a pivoted trip member having a releasable connection with said lever and arranged to maintain said lever in inoperative position, said trip member having a portion extending above said base and arranged to be moved by the tone arm for effecting the release of said lever to movement in accordance with its tendency.

15. A talking machine having, in combination, a supporting base, a turntable and a tone arm mounted above said base, the base having a slot therethrough adjacent to the axis of the tone arm, a bracket mounted on the base and in said slot, a trip member movably supported by said bracket and projecting above said base and arranged to be moved by the tone arm, a lever having a releasable connection with said trip member and normally held by said member in inoperative position but releasable by movement of said member, spring means tending to move said lever, and braking means beneath said base arranged to be operated by said lever and to control the turntable.

16. A talking machine having, in combination, a supporting base with an opening therein, a plate closing said opening and having a slot therein, a tone arm, a bracket mounted in said opening in the base, a brake-operating lever pivoted on said bracket and tending to move in the direction to apply the brake but being normally anchored in its inoperative position, and a trip member also pivoted on said bracket and extending upwardly through the slot in the plate in position to be moved by the tone arm, said trip member being adapted to release said lever to movement in accordance with its tendency.

17. A talking machine having, in combination, a supporting base, a record support and a tone arm mounted thereon, a bracket adjustably mounted on said base, a lever pivoted on said bracket, a member movably mounted on said bracket, a brake operable by said member, said member normally tending to move in a direction to apply the brake but being normally anchored in its inoperative position, a trip member arranged to be moved by the tone arm and arranged to release the first mentioned member to movement in accordance with its tendency, and a device rigid with said bracket and arranged to be engaged by the tone arm whereby the bracket may be bodily adjusted by movement of the tone arm into different positions depending upon the relative position of the convolutions at the end of the record to be played.

18. A talking machine having, in combination, a supporting base, a record support, a tone arm, said base having an aperture through its top wall adjacent to the axis of said tone arm, a guide along said aperture, a bracket slidably mounted in said guide, said bracket comprising an upstanding portion above the base arranged to be engaged by the tone arm to bodily move the bracket into any desired position depending upon the end convolutions of the record to be played, a brake, and two members movably mounted on said bracket and adjustable therewith, one of said members being arranged to operate said brake and normally tending to move in a direction to apply the brake but normally anchored to prevent such movement, the other one of said members being arranged to be moved by the tone arm and to release the brake-operating member to movement in accordance with its tendency.

19. A talking machine having, in combination, a base, a tone arm, a brake-operating lever pivoted on a horizontal axis to swing in a vertical plane and arranged to operate said braking means and tending to move in a direction to apply the brake, anchoring means normally holding said lever in its inoperative position, and a trip member pivoted on a horizontal axis to swing in a vertical plane and arranged to be moved by the tone arm to release said anchoring means.

20. A talking machine having, in combination, a base, a tone arm, a bracket adjustably mounted on the base and having means to be engaged by the tone arm to adjust the bracket to different positions, and brake-operating means mounted on said bracket and normally held in its inoperative position but operable by movement of said tone arm to cause application of the brake.

21. A talking machine having, in combination, a base, a tone arm, a guide mounted on the base adjacent to the tone arm, a bracket slidably associated with said guide and frictionally held against accidental movement, a trip member pivoted on said bracket and projecting above said guide to be engaged by the tone arm, a brake-operating lever pivoted on said bracket, and anchoring means including a pivoted dog for holding said lever in its inoperative position, said anchoring means being releasable by movement of said trip member.

22. A talking machine having, in combination, a base, a tone arm, a bracket adjustably mounted on said base, an abutment on said bracket arranged to be engaged by the tone arm to adjust the position of the bracket by movement of the tone arm, and brake-operating means mounted on the bracket for adjustment bodily therewith and including a member extending alongside said abutment and also arranged to be engaged by the tone arm for causing actuation of said brake-operating means.

23. Controlling means of the character described comprising, in combination, a pivoted lever and a pivoted trip member disengageably connected together, and a spring acting upon both the lever and the trip member when connected together to hold them in inoperative position and acting upon the lever only when the trip member has been disengaged therefrom to move the lever into operative position.

24. A talking machine having, in combination, a base, a tone arm, a bracket mounted for adjustment on said base and having an upstanding abutment, a pin on the tone arm arranged to engage said abutment to bodily adjust the bracket to different positions, and brake-operating means mounted on the bracket and including a member extending alongside said abutment and arranged to be engaged and moved by the said pin for causing actuation of said brake-operating means.

25. Controlling means of the character described comprising a guide, a supporting bracket slidably mounted on said guide, two members pivoted on said bracket, a dog pivoted on one member and engaging the other member, and a spring tending to move one member, the other member being movable to release said dog and permit the spring-actuated member to be moved.

26. Controlling means of the character described comprising a guide, a supporting bracket slidably mounted in said guide, a lever and a trip member both pivoted on said bracket, a spring engaging said lever and tending to swing the same, and a dog pivoted on said lever and engaging said trip member to normally prevent swinging of the lever, said trip member being movable to release said dog.

27. Controlling means of the character described comprising a support, a lever pivoted on said support, a trip member mounted on said support, a spring engaging said lever and said support and tending to swing the lever, a dog pivoted on said lever and detachably engaging said trip member to normally prevent swinging of said lever, a spring carried by said lever and engaging said dog, and a lug on said lever arranged to limit the movement of said dog caused by the last mentioned spring.

28. Controlling means of the character described comprising a support, a lever and a trip member both pivoted on said support, a spring tending to swing said lever in one direction, a dog pivoted on said lever and detachably engaging said trip member to normally prevent swinging of said lever, said trip member when moved in one direction releasing said dog to allow movement of said lever and said trip member when moved in the opposite direction being arranged to swing said lever to reëngage the dog.

29. Controlling means of the character described comprising a support, a bell-crank lever and a trip member both pivoted on said support, a spring tending to swing said lever in one direction, and a dog pivoted on said lever, said trip member having two parts with one of which said dog engages to normally prevent movement of said lever, said trip member being movable to withdraw said part from engagement by the dog and the other one of said parts on the trip member being arranged to engage the lever to return the dog into engagement with the first mentioned part when the trip member is swung.

In testimony whereof, I have hereunto set my hand.

WILLIAM P. DUN LANY.